(12) United States Patent
Nakarmi et al.

(10) Patent No.: US 11,589,211 B2
(45) Date of Patent: *Feb. 21, 2023

(54) HANDLING IDENTIFIER VALIDATION

(71) Applicant: Telefonaktiebolaget LM Ericsson (publ), Stockholm (SE)

(72) Inventors: Prajwol Kumar Nakarmi, Sollentuna (SE); Pasi Saarinen, Spånga (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

This patent is subject to a terminal disclaimer.

(21) Appl. No.: 17/375,137

(22) Filed: Jul. 14, 2021

(65) Prior Publication Data

US 2021/0345088 A1   Nov. 4, 2021

Related U.S. Application Data

(63) Continuation of application No. 16/343,867, filed as application No. PCT/EP2018/086416 on Dec. 20, 2018, now Pat. No. 11,102,640.

(Continued)

(51) Int. Cl.
*H04W 8/18* (2009.01)
*H04W 12/06* (2021.01)
(Continued)

(52) U.S. Cl.
CPC ............ *H04W 8/18* (2013.01); *H04W 12/02* (2013.01); *H04W 12/06* (2013.01); *H04W 48/18* (2013.01)

(58) Field of Classification Search
CPC ......... H04W 8/18; H04W 8/20; H04W 12/02; H04W 12/72; H04W 12/06; H04W 12/03; H04W 48/18
See application file for complete search history.

(56) References Cited

U.S. PATENT DOCUMENTS 7,096,273 B1   8/2006   Meier
8,290,474 B2   10/2012  Norgaard et al.
(Continued)

FOREIGN PATENT DOCUMENTS

CN   101690039 A   3/2010
CN   102177740 A   9/2011
(Continued)

OTHER PUBLICATIONS

3rd Generation Partnership Project, "3rd Generation Partnership Project; Technical Specification Group Services and System Aspects; Security Architecture and Procedures for 5G System (Release 15)", Technical Specification, 3GPP TS 33.501 V0.6.0, Dec. 1, 2017, pp. 1-79, 3GPP.

(Continued)

*Primary Examiner* — Farid Seyedvosoghi
(74) *Attorney, Agent, or Firm* — Coats & Bennett, PLLC

(57) ABSTRACT

A network function performs a method to identify an invalid subscription concealed identifier, SUCI. When the network function receives a message containing a SUCI, it determines a size of the SUCI contained in the received message, and also determines an expected size of the SUCI in the received message. The network function then determines whether the size of the SUCI contained in the received message satisfies a criterion associated with the expected size. If the size of the SUCI contained in the received message does not satisfy the criterion associated with the expected size, the network function determines that the SUCI in the received message is invalid, and it rejects the SUCI in the received message if it is determined to be invalid.

20 Claims, 9 Drawing Sheets

Related U.S. Application Data

(60) Provisional application No. 62/616,574, filed on Jan. 12, 2018.

(51) Int. Cl.
*H04W 12/02* (2009.01)
*H04W 48/18* (2009.01)

(56) References Cited

U.S. PATENT DOCUMENTS

| | | |
|---|---|---|
| 9,775,149 B2 | 9/2017 | Fwu et al. |
| 9,838,365 B2 | 12/2017 | Park et al. |
| 10,104,379 B2 | 10/2018 | Filippov et al. |
| 10,856,265 B2 | 12/2020 | Ryu |
| 2016/0295398 A1 | 10/2016 | Ketheesan et al. |
| 2017/0264439 A1 | 9/2017 | Muhanna et al. |
| 2019/0149521 A1 | 5/2019 | Jerichow |

FOREIGN PATENT DOCUMENTS

| | | |
|---|---|---|
| CN | 104067537 A | 9/2014 |
| JP | 2017516368 A | 6/2017 |
| WO | 2007010363 A2 | 1/2007 |
| WO | 2018008980 A1 | 1/2018 |

OTHER PUBLICATIONS

Ericsson, "Clause 6.12.5 (SIDF—Size of SUCI)", 3GPP TSG SA WG3 (Security) Meeting #90, Gothenburg, Jan. 22, 2018, pp. 1-2, S3-180304, 3GPP.

Siemens Atea, "Problem with no USIM-ME interface in GSM-only ME", 3GPP TSG SA WG3—SA 3 #17, Gothenberg, Sweden, Feb. 27-Mar. 2, 2001, S3-010044.

3rd Generation Partnership Project, 3rd Generation Partnership Project; Technical Specification Group Services and System Aspects; Security Artchitecture and Procedures for 5G System (Release 5), Technical Specification, 3GPP TS 33.501 V0.6.0 (Dec. 2017).

HANDLING IDENTIFIER VALIDATION

RELATED APPLICATIONS

This application is a continuation of U.S. application Ser. No. 16/343,867, filed 22 Apr. 2019, which was the National Stage of International Application No. PCT/EP2018/086416, filed 20 Dec. 2018, which claims the benefit of U.S. Provisional Application No. 62/616,574, filed 12 Jan. 2018. The disclosure of Ser. No. 16/343,867 and PCT/EP2018/086416 are incorporated herein by reference in their entirety.

BACKGROUND

The present disclosure relates generally to the use and validation of an identifier.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the following description.

5G is a next generation of mobile networks developed by a standards developing organization called the 3GPP. The earlier generations of mobile networks were called 4G/LTE, 3G/UMTS, and 2G/GSM. A 5G network is maintained and its services are offered by the so-called Mobile Network Operators (MNOs). MNOs are distinguishable from each other by two types of codes, namely the Mobile Country Code (MCC) and the Mobile Network Code (MNC). In order to use a particular 5G network offered by a particular MNO, users are required to have a sort of contractual relationship with that MNO, that relationship being generally called the subscription. Each subscription in a MNO's 5G network is identified by a unique long-term identifier called the Subscription Permanent Identifier (SUPI). Users wirelessly access a 5G network over-the-air using a wireless device known as User Equipment (UE). Before providing any service, a 5G network needs to identify a user, i.e., the user's subscription, behind a UE. For this purpose of identification, UEs in earlier generation of mobile networks (4G, 3G, and 2G) used to send users' unique long-term identifier over-the-air. This was considered a privacy issue because users could be tracked or identified by any unauthorized entity capable of intercepting message or acting as man-in-the-middle over-the-air. However, in a 5G network, an MNO has an ability to offer better privacy to its users so that their unique long-term identifiers (i.e., SUPIs) are not visible over-the-air. That ability comes from a mechanism in which UEs, instead of sending SUPIs, calculate and send concealed a identifier over-the-air, which is called the Subscription Concealed Identifier (SUCI).

The calculation of SUCI actually means the UE encrypting the SUPI and is done before the SUCI is transferred over-the-air between the UE and the 5G network. The encryption is of asymmetric type and uses the MNO's public key (denoted HN public key, HN meaning home network). There could be multiple ways of doing the asymmetric encryption of the SUPI for calculating the SUCI, these ways denoted as encryption schemes. Some example of the encryption schemes are ElGamal encryption scheme, RSA encryption, and Elliptic Curve Integrated Encryption Scheme (ECIES), There could also be multiple variants of the same encryption scheme, e.g., different elliptic curves could be used with an ECIES encryption scheme like SECP256R1, SECP384R1, and CURVE25519. Multiple variants of the same encryption schemes are treated as separate encryptions schemes. Therefore the above mentioned examples of the encryption schemes are ElGamal encryption scheme, RSA encryption, ECIES-SECP256R1, ECIES-SECP384R1, and ECIES-CURVE25519.

These encryption schemes could either be standardized, say by the 3GPP, or be proprietary, decided by each MNO on its own. On one hand, the advantage of standardized encryption schemes is that those encryption scheme becomes publicly available or known, which increases interoperability, e.g., all UE vendors could support the standardized schemes. On the other hand, the advantage of proprietary encryption schemes is that each MNO can independently choose and use any encryption scheme suitable to its operational efficiency, security and privacy offerings, or regulatory requirements.

FIG. 1 is a high level sequence diagram showing the message flow for UE Registration using SUCI.

In Step 101, the UE connects to a gNB over-the-air (the gNB being a 5G base station and part of the 5G Radio Access Network (RAN)) and sends a Registration Request message which comprises a SUCI calculated by the UE. In Step 102, the gNB forwards the received Registration Request message to a core network node. We denote that core network node as an Access and Mobility Management Function (AMF) or Security Anchor Function (SEAF) interchangeably. The gNB and AMF/SEAF are collectively denoted as the Serving Network (SN). The SEAF further locates the Authentication Server Function (AUSF). The SEAF then creates and sends to the AUSF in Step 103 a 5G Authentication Information Request (AIR) that among other information contains the received SUCI. The AUSF then contacts the Unified Data Management (UDM) or Subscription Identifier De-concealing Function (SIDF) function in Step 104. The AUSF and UDFM/SIDF are collectively denoted as the Home Network (HN).

Note that the in case of roaming the SN and the HN belong to different MNOs while otherwise both the SN and HN belong to the same MNO.

Note that registration involves more steps than these messages but this gives an overview of how the SUCI travels over the network.

There currently exist certain challenge(s). In 5G, the calculation of SUCI could be done using one of multiple encryption schemes. When a network function (or network node, used interchangeably) in a 5G network receives a SUCI (from a UE or from another network function) it becomes challenging for the receiver network function to determine if the received SUCI is valid or not.

SUMMARY

Certain aspects of the present disclosure and their embodiments may provide solutions to these or other challenges. Specifically, there is disclosed a mechanism that enables a network function to determine the validity of a received SUCI.

There are, proposed herein, various embodiments which address one or more of the issues disclosed herein.

According to one embodiment, there is provided a method performed by a network function to identify an invalid subscription concealed identifier, SUCI, the method comprising:

receiving a message containing a SUCI;
determining a size of the SUCI contained in the received message;
determining an expected size of the SUCI in the received message;
determining whether the size of the SUCI contained in the received message satisfies a criterion associated with the expected size;
determining that the SUCI in the received message is invalid if the size of the SUCI contained in the received message does not satisfy the criterion associated with the expected size; and
rejecting the SUCI in the received message if it is determined to be invalid.

According to another embodiment, there is provided a method performed by a wireless device for calculating a subscription concealed identifier, SUCI, the method comprising:

receiving a message indicating a criterion associated with a size of a SUCI;
calculating the SUCI based on an encryption scheme;
determining whether the calculated SUCI satisfies the criterion associated with the size of the SUCI; and
using the calculated SUCI only if it is determined that it satisfies the criterion associated with the size of the SUCI.

According to further embodiments, there are provided computer programs for causing a suitably processor to perform the methods according to the previous embodiments.

In addition, there are provided computer program products, containing the respective computer programs. For example, the computer program products may comprise computer readable media containing the computer programs. The computer readable media may comprise tangible media.

Certain embodiments may provide an effective and efficient mechanism that enables network functions to determine if a received SUCI is valid or not. The effectiveness comes from being able to confirm if any SUCI is definitely invalid. The efficiency comes from being able to discard invalid SUCI early and with minimal processing. Consequently, robustness of network functions could be increased.

BRIEF DESCRIPTION OF THE DRAWINGS

Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art.

DETAILED DESCRIPTION

Figure 1:
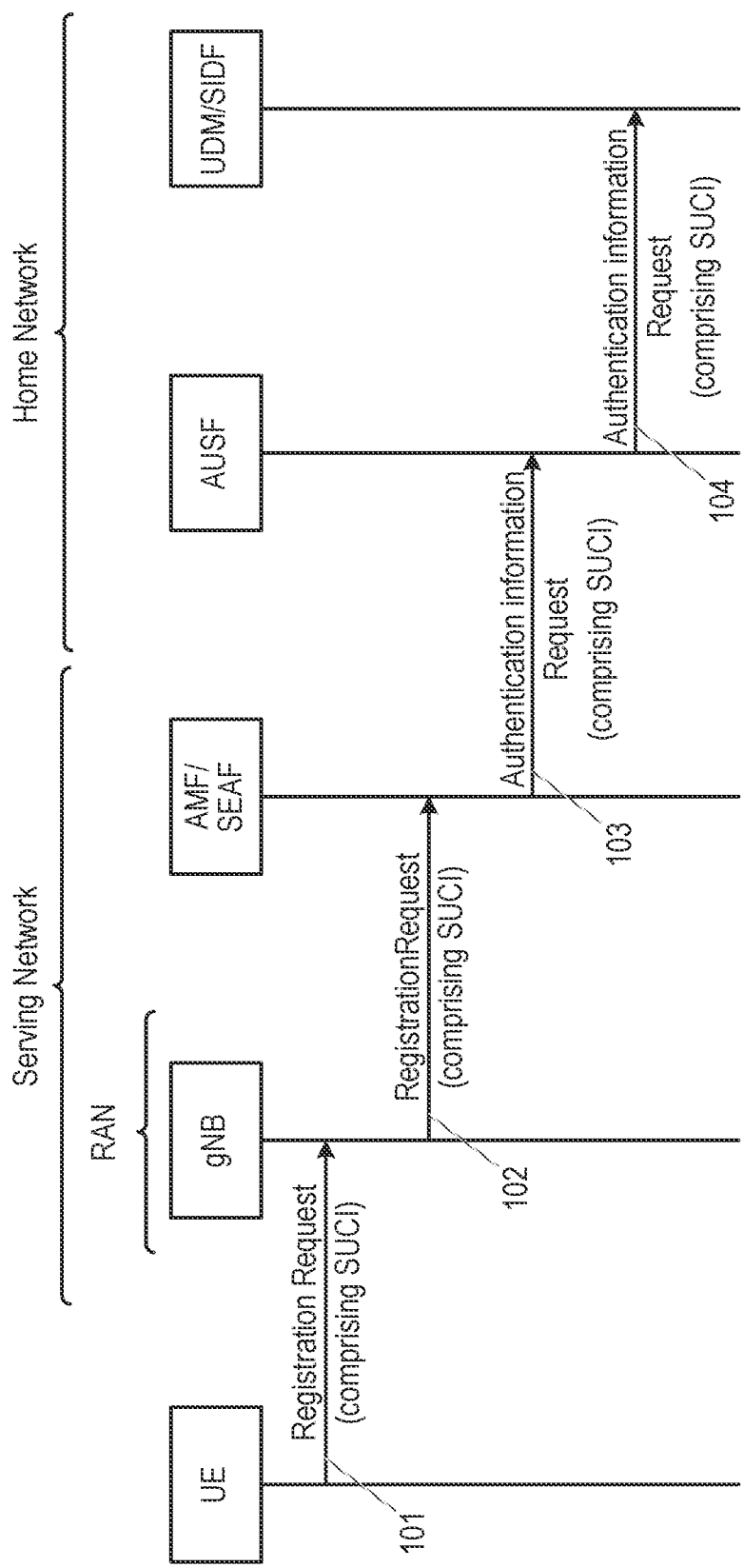
FIG. 1 is a signaling diagram, showing a UE Registration process.

In a 5G network, the UE calculates the SUCI using one of multiple encryption schemes. The UE sends the calculated SUCI to the 5G network. The gNB is the first network function which receives the SUCI. The gNB further transfers the received SUCI to the SEAF. The SEAF further transfers the received SUCI to the UDM. As such and as mentioned earlier, when a network function (or network node, used interchangeably) receives a SUCI, it becomes a challenge for the receiver network function to determine if the received SUCI is valid or not. More concretely, it becomes a challenge for the gNB, SEAF, and UDM to determine if the received SUCI is valid or not.

One potential solution to address the said challenge is that both the UE and the 5G network agree beforehand on mutual identification of the encryption scheme that the UE would use when calculating the SUCI. This mutual identification could be done by an identifier called the encryption scheme identifier. The actual mechanism by which the UE and the 5G network become able to mutually agree or share the encryption scheme identifier is out of the scope, and is therefore not discussed except than mentioning that HNs could use mechanisms such as the so-called over-the-air (OTA) provisioning. The standardized encryption schemes could have correspondingly standardized encryption scheme identifiers, e.g., if ECIES encryption is standardized, then say ECIES-SECP256R1 is identified with encryption scheme identifier 1, and ECIES-SECP384R1 is identified with encryption scheme identifier 2. Similarly, the proprietary encryption schemes could have correspondingly proprietary encryption scheme identifiers, e.g., if RAS encryption is chosen by a MNO, then that MNO can choose some number of its choice, say 99 as encryption scheme identifier. The UE would then send to the 5G network, the SUCI comprising the encryption scheme identifier that it used to calculate the SUCI. The network functions could inspect the received encryption scheme identifier and determine if the received SUCI is valid or not.

While the above solution works, there are still other aspects that need consideration. One aspect is that the said encryption scheme identifier is not technically bound to the actual encryption scheme that the UE used to calculate the SUCI. While a genuine and well-behaving UE would send the correct encryption scheme identifier corresponding to the actual encryption scheme used, the same cannot be said for a fraudulent or misbehaving UE. This is true for both the standardized and the proprietary encryption schemes and encryption scheme identifiers. Another aspect is that, for proprietary encryption schemes, determining and assigning the corresponding encryption scheme identifier is generally in the merit of the HN and is made available to the UE. Since, the SN (comprising gNB and SEAF) is transferring the SUCI to the HN, the proprietary encryption scheme identifiers are not made available to the SN. Therefore, the SN does not know which encryption scheme was used by the UE for calculation of the SUCI when the encryption scheme identifier is a non-standardized or proprietary value.

One consequence of the above mentioned aspects is that an invalid SUCI would only be detected after the HN tried and failed to decrypt the received SUCI. As we see from FIG. 1, this happens very late in the process and therefore an invalid SUCI would result in waste of resources of all nodes up to the HN. Additionally, it is not unlikely that a misbehaving UE would recalculate and resubmit its SUCI causing the same issue to occur multiple times. Another consequence is that a fraudulent or misbehaving UE could send an invalid SUCI on purpose to harm the 5G network in general. This would waste the resources of the network which possibly leads to valid UEs being denied service. Yet another consequence is that a fraudulent or misbehaving UE that is colluding with the HN has a free one-way communication channel from the UE to the HN. While it is unlikely that an UE and HN are colluding in this way such attacks cannot be completely ruled out.

In the following, there is described a method invention which mitigates the above mentioned problems.

It is noted that the size of the SUCI resulting from the output of an encryption scheme (denoted encryption scheme output) has a predictable size. For example, when an encryption scheme, such as the above mentioned ECIES, uses a 256-bit elliptic curve with point compression, the size of the UE's ephemeral public key would be 256 bits; sign indication if any would be 1 bit; encrypted output of the SUPI would be 60 bits. This means that the total size of the SUCI resulting from the output of any this encryption scheme would be in the order of 320 bits. Similarly, when a RSA encryption scheme is used, the SUCI could be in the order of 2100 bits.

The methods described here use the above mentioned predictability of size of the encryption scheme output to determine the validity of the SUCI. Further explanation follows.

It is our teaching that standardized encryption schemes could have standardized maximum size limitation of encryption scheme output along with the standardized encryption scheme identifier. Then, network functions (in RAN, SN, and HN) such as the gNB, SEAF or UDM could reject SUCIs of size larger the maximum size limitation. Similarly, it is also our teaching that proprietary encryption schemes would similarly have proprietary maximum size limitation of encryption scheme output along with the proprietary encryption scheme identifier. This proprietary maximum size limitation of encryption scheme output could be made available to the network functions in the HN as well as the SN. The SN could be informed of the size limitation either by additional signaling between the HN and SN or for example through separate operation and maintenance functions as a part of the roaming agreement (for roamed or visited networks). We also teach that each network function could also use its own local or a system wide maximum size limitation so that any proprietary scheme does not exploit the network. As an example of a local size limitation, one part of the network, for example the AMF network node may have a different expected size from another network node such as the AUSF node. To avoid that UEs unintentionally attempt to use proprietary SUCIs longer than the local or system wide limitations set by the SN, such size limitations could be broadcasted over-the-air in system broadcast message or made known to UE in some other protocol messages, such as a Random Access Response (RAR) message.

Further, it is our teaching that there could also be one overall worldwide standardized maximum size applicable for all standardized or proprietary schemes. That maximum size could for example be set according to the transport block size of radio channel.

A person skilled-in-the-art will appreciate that our teachings do not limit other types of size limitations than the maximum type. One example is that, there could also be a similar limitation on minimum size, so that the network functions can reject SUCIs smaller in size than that minimum size. Another example is that there could be an estimated size and allowed deviation. For example, an estimated size could be 500 bits and allowed deviation could be plus or minus 100. The network functions would then reject any SUCI longer than 600 bits or shorter than 400 bits. Further, there could also be customizable granularity of size limitations based on other aspects or information, such as the time (for example a stricter size restriction could be applied at specific times when the network is busy, such as during office hours); the location (for example applying a stricter size restriction near sensitive sites such as a parliament building); the network load (for example applying a stricter size restriction when the network is under particular load); the network type (for example, applying a stricter size restriction if the network is from a poor vendor); operator information (for example applying separate size restrictions based on the PLMN id); or roaming partner information (for example applying stricter size restriction for devices from particular countries).

Figure 2:
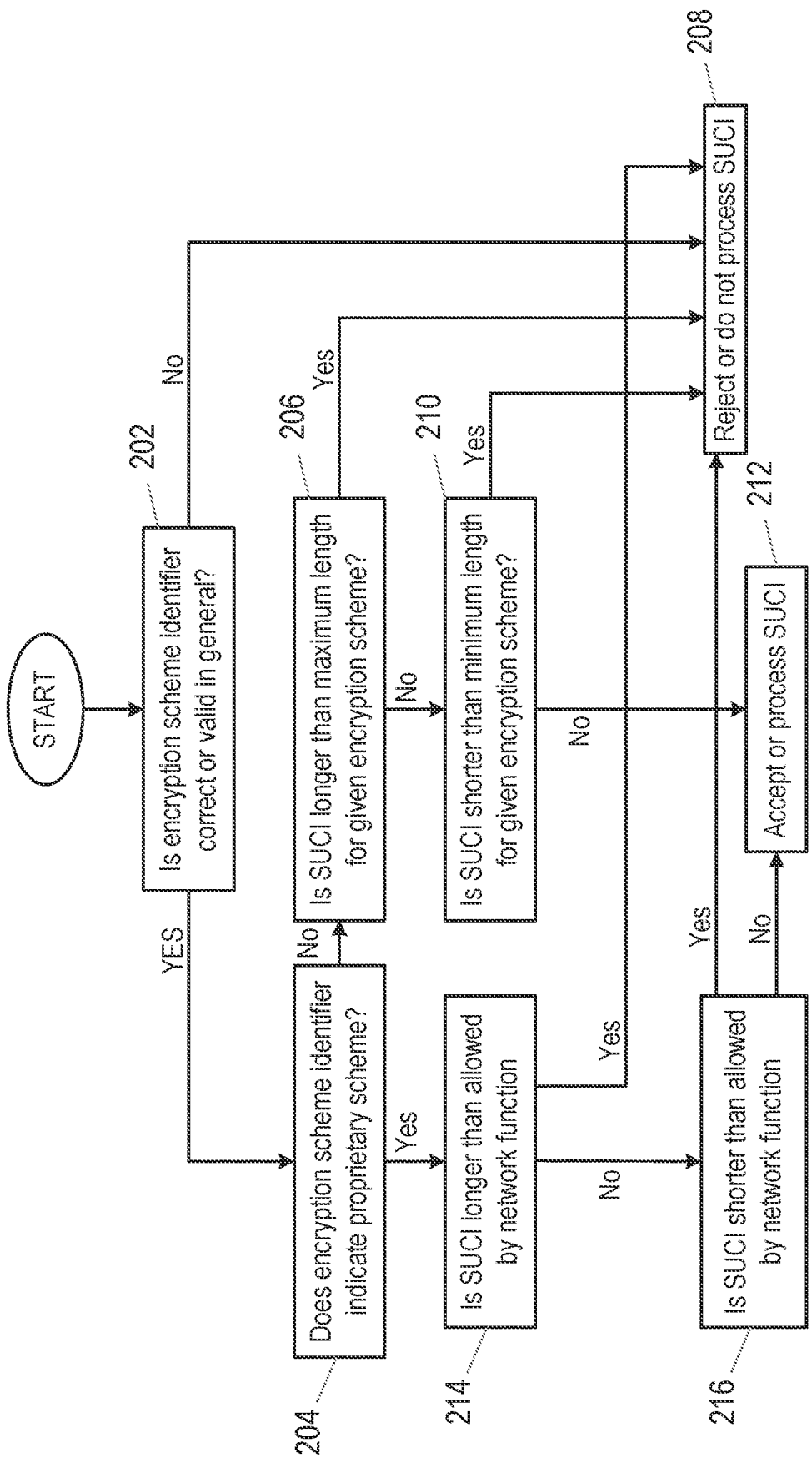
FIG. 2 is a flow chart, illustrating a method according to this disclosure.

FIG. 2 is an example flowchart, showing a method of SUCI validation in network functions using maximum and minimum sizes.

A network function that receives a SUCI could start, as shown at step 202, when receiving a message that contains a SUCI, by verifying that in general a valid encryption scheme identifier has been used, if applicable. For example, it could be a part of protocol parsing where alphabet characters (a-z) are considered invalid for numeric field (0-9). The receiver network could reject generally invalid SUCIs. If it is found that the encryption scheme identifier appears generally valid, the process passes to step 204, in which the network function further checks the encryption scheme identifier and determines whether a proprietary scheme is used or if a standardized scheme is used. Then, the network function forks off accordingly.

If the encryption scheme identifier indicates that a proprietary scheme is not used, the network function determines an expected size of the SUCI contained in the received message. This expected size will be known based on the standardized encryption scheme that is being used. For example, in certain standardized schemes, the expected size of the SUCI may be equal to the size of the input, or may be equal to the size of the input plus a size of a public key, or may be equal to a size of the input plus a size of a public key, plus a size of an associated Message Authentication Code. The network function then determines one or more criteria associated with the expected size. For example, the network function may determine a maximum size criterion (for example greater than or equal to the expected size), or a minimum size criterion (for example smaller than or equal to the expected size), or maximum and minimum sizes defining a size range criterion (for example encompassing the expected size). The network function then checks whether or not the received SUCI complies with any corresponding limits. In FIG. 2, examples of these limits are minimum and maximum lengths for SUCI. Thus, the process first passes to step 206, in which it is determined whether the SUCI is longer than a maximum length. If so, the process passes to step 208, and the SUCI is rejected. If the SUCI is not longer than a maximum length, the process passes to step 210, in which it is determined whether the SUCI is shorter than a minimum length. If so, the process passes to step 208, and the SUCI is rejected. If the SUCI is not shorter than the minimum length, the process passes to step 212, and the SUCI is accepted or processed.

If the encryption scheme identifier indicates in step 204 that a proprietary scheme is used, the network function determines an expected size of the SUCI contained in the received message, based on the encryption scheme. The network function then determines one or more criteria associated with the expected size. For example, the network function may determine a maximum size criterion (for example greater than or equal to the expected size), or a minimum size criterion (for example smaller than or equal to the expected size), or maximum and minimum sizes defining a size range criterion (for example encompassing the expected size). In addition, an overall maximum size may be set, such that this maximum size will apply regardless of the encryption scheme that is used. The network function then checks whether or not the received SUCI complies with any corresponding limits. In FIG. 2, examples of these limits are minimum and maximum lengths for SUCI. Thus, the process passes to step 214, in which it is determined whether the SUCI is longer than a maximum length allowed by the network function. If so, the process passes to step 208, and the SUCI is rejected. If the SUCI is not longer than the maximum length, the process passes to step 216, in which it is determined whether the SUCI is shorter than a minimum length. If so, the process passes to step 208, and the SUCI is rejected. If the SUCI is not shorter than the minimum length, the process passes to step 212, and SUCI is accepted or processed.

In this figure, the consequence of determining that the SUCI does not meet the specified criterion is said to be that the SUCI is rejected. This means that some action is taken, rather than normal processing of the message including the SUCI. More specifically, one possibility is that the invalid SUCI will not be decrypted by the network. Another possibility is no further processing is done, and instead some error message will be returned, e.g., authentication-failure or subscription-unknown or invalid-SUCI. Other possible actions are logging, informing other nodes, re-provisioning the UE, paging the UE, and trying to decrypt SUCI anyway using some other heuristics. Another option is to just drop invalid messages with no information provided to the nodes sending invalid messages.

Thus, the figure shows the examples of these limits corresponding to encryption scheme or the network function itself. Note that when a standardized encryption scheme is used, it is not preferable for the network function to have any kind of limit that results in rejection of SUCIs that are within the standardized limits for the given encryption scheme. However, for proprietary schemes the network might have their own configuration of allowed lengths.

It should be appreciated that our teachings enable network function to determine validity of SUCIs and take corresponding actions, like proceeding with processing of SUCI or rejecting SUCIs. Mind that our teachings do not require network functions to perform actual decryption of the received SUCIs. This makes our teachings very efficient in the terms of computation. Further, receiver network functions would be able to verify validity of SUCI very early, for example by the network functions in RAN (e.g., gNB), SN (e.g., SEAF) and can early reject invalid SUCIs. This further increases efficiency in the sense of network messaging overhead and resource allocation. Additionally, our teachings does not have risk of rejecting valid SUCIs because valid SUCIs would comply with the size limitation. In other words, there is no chance of false negatives, which in turn makes the method very effective.

A similar process to that described above can be performed by the wireless device, when calculating a subscription concealed identifier, SUCI. Specifically, the wireless device may (in advance) receive a message indicating a criterion associated with a size of a SUCI. When wishing to communicate with the network, the wireless device may calculate the SUCI based on an encryption scheme. The wireless device may then determine whether the calculated SUCI satisfies the criterion associated with the size of the SUCI. The wireless device may then use the calculated SUCI only if it is determined that it satisfies the criterion associated with the size of the SUCI.

For example, the wireless device may receive the message indicating the criterion associated with the size of a SUCI in a broadcast message or in a protocol message sent specifically to the wireless device.

The criterion associated with the size of the SUCI may comprise a maximum size, a minimum size, or a size range. The maximum size may be set based on the scheme used for calculating the SUCI.

This allows the wireless device to carry out a check before transmitting the SUCI to the network. If the wireless device determines that the calculated SUCI does not satisfy the criterion associated with the size of the SUCI (that is, for example, if the size of the SUCI exceeds a maximum size), in certain embodiments the wireless device does not send the calculated SUCI to the network. For example, if the wireless device finds out that the generated SUCI is large, then it can recalculate SUCI because there was some intermediate bug. The ME could also try other encryption schemes if there is a choice. The wireless device could also inform its vendor or some network node via WIFI. The wireless device could also try to connect via 4G or 3G or 2G where this encryption is not used. Then the wireless device could inform vendor or some network node via 4G or 3G or 2G.

Figure 3:
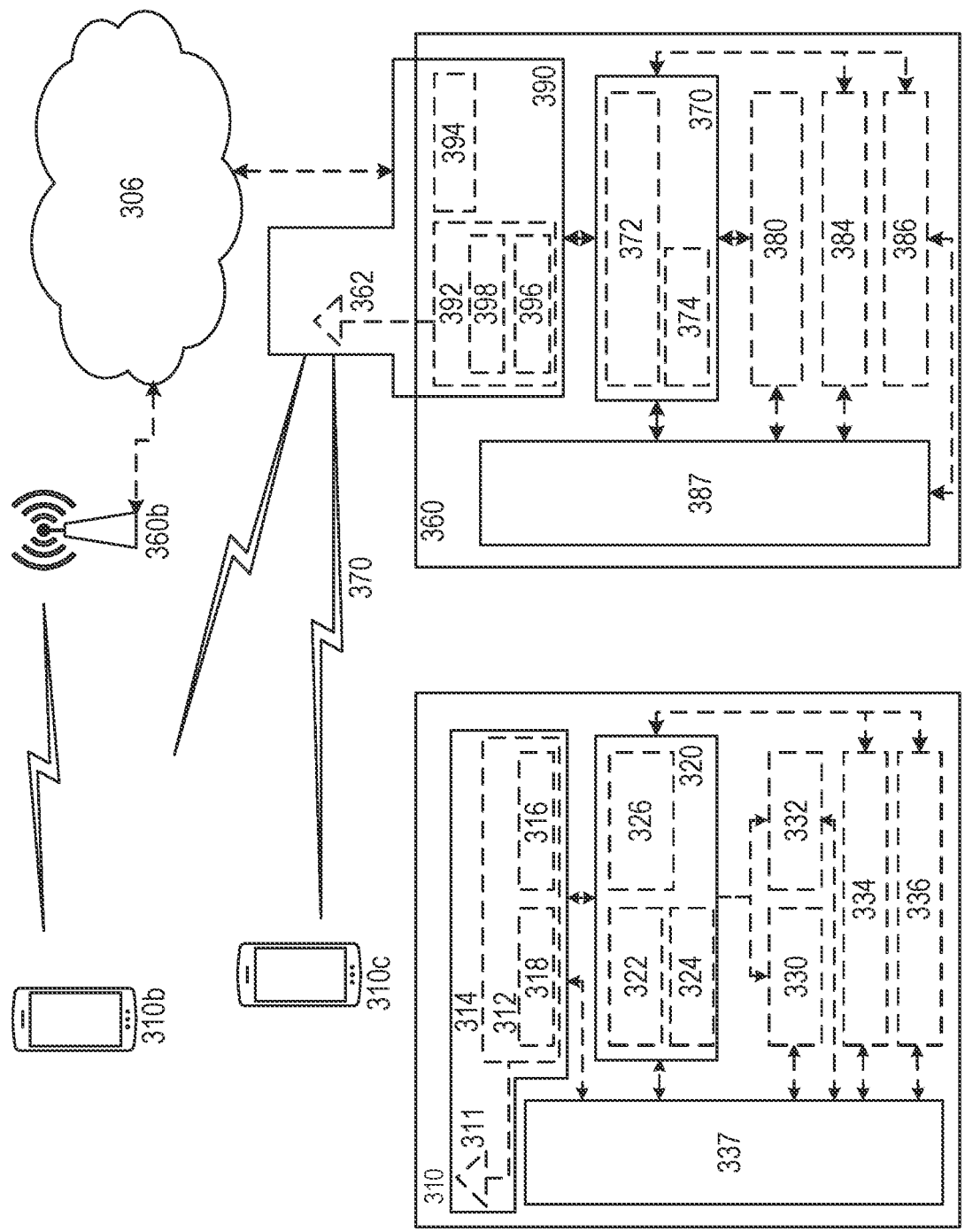
FIG. 3 illustrates a communication network, including network nodes and wireless devices.

FIG. 3 illustrates a wireless network in accordance with some embodiments.

Although the subject matter described herein may be implemented in any appropriate type of system using any suitable components, the embodiments disclosed herein are described in relation to a wireless network, such as the example wireless network illustrated in FIG. 3. For simplicity, the wireless network of FIG. 3 only depicts network 306, network nodes 360 and 360b, and WDs 310, 310b, and 310c. In practice, a wireless network may further include any additional elements suitable to support communication between wireless devices or between a wireless device and another communication device, such as a landline telephone, a service provider, or any other network node or end device. Of the illustrated components, network node 360 and wireless device (WD) 310 are depicted with additional detail. The wireless network may provide communication and other types of services to one or more wireless devices to facilitate the wireless devices' access to and/or use of the services provided by, or via, the wireless network.

The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMAX), Bluetooth, Z-Wave and/or ZigBee standards.

Network 306 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node 360 and WD 310 comprise various components described in more detail below. These components work together in order to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes include, but are not limited to, access points (APs) (e.g., radio access points), base stations (BSs) (e.g., radio base stations, Node Bs, evolved Node Bs (eNBs) and NR NodeBs (gNBs)). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multi-cast coordination entities (MCEs), core network nodes (e.g., MSCs, MMEs), O&M nodes, OSS nodes, SON nodes, positioning nodes (e.g., E-SMLCs), and/or MDTs. As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

In FIG. 3, network node 360 includes processing circuitry 370, device readable medium 380, interface 390, auxiliary equipment 384, power source 386, power circuitry 387, and antenna 362. Although network node 360 illustrated in the example wireless network of FIG. 3 may represent a device that includes the illustrated combination of hardware components, other embodiments may comprise network nodes with different combinations of components. It is to be understood that a network node comprises any suitable combination of hardware and/or software needed to perform the tasks, features, functions and methods disclosed herein. Moreover, while the components of network node 360 are depicted as single boxes located within a larger box, or nested within multiple boxes, in practice, a network node may comprise multiple different physical components that make up a single illustrated component (e.g., device readable medium 380 may comprise multiple separate hard drives as well as multiple RAM modules).

For example, the illustrated network node 360 is a radio access network node. However, the methods described herein may be used in any network node or network function, including, by way of example only, and without any limitation, core network nodes such as an Access and Mobility Management Function (AMF) or Security Anchor Function (SEAF); an Authentication Server Function (AUSF); or a Unified Data Management (UDM) or Subscription Identifier De-concealing Function (SIDF) function. In the case of such core network nodes, the respective network node may include any or all of the components shown in FIG. 3, but may not include the wireless communication functionality shown in the Figure.

Similarly, network node 360 may be composed of multiple physically separate components (e.g., a NodeB component and a RNC component, or a BTS component and a BSC component, etc.), which may each have their own respective components. In certain scenarios in which network node 360 comprises multiple separate components (e.g., BTS and BSC components), one or more of the separate components may be shared among several network nodes. For example, a single RNC may control multiple NodeB's. In such a scenario, each unique NodeB and RNC pair, may in some instances be considered a single separate network node. In some embodiments, network node 360 may be configured to support multiple radio access technologies (RATs). In such embodiments, some components may be duplicated (e.g., separate device readable medium 380 for the different RATs) and some components may be reused (e.g., the same antenna 362 may be shared by the RATs). Network node 360 may also include multiple sets of the various illustrated components for different wireless technologies integrated into network node 360, such as, for example, GSM, WCDMA, LTE, NR, WiFi, or Bluetooth wireless technologies. These wireless technologies may be integrated into the same or different chip or set of chips and other components within network node 360.

Processing circuitry 370 is configured to perform any determining, calculating, or similar operations (e.g., certain obtaining operations) described herein as being provided by a network node. These operations performed by processing circuitry 370 may include processing information obtained by processing circuitry 370 by, for example, converting the obtained information into other information, comparing the obtained information or converted information to information stored in the network node, and/or performing one or more operations based on the obtained information or converted information, and as a result of said processing making a determination.

Processing circuitry 370 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 360 components, such as device readable medium 380, network node 360 functionality. For example, processing circuitry 370 may execute instructions stored in device readable medium 380 or in memory within processing circuitry 370. Such functionality may include providing any of the various wireless features, functions, or benefits discussed herein. In some embodiments, processing circuitry 370 may include a system on a chip (SOC).

In some embodiments, processing circuitry 370 may include one or more of radio frequency (RF) transceiver circuitry 372 and baseband processing circuitry 374. In some embodiments, radio frequency (RF) transceiver circuitry 372 and baseband processing circuitry 374 may be on separate chips (or sets of chips), boards, or units, such as radio units and digital units. In alternative embodiments, part or all of RF transceiver circuitry 372 and baseband processing circuitry 374 may be on the same chip or set of chips, boards, or units In certain embodiments, some or all of the functionality described herein as being provided by a network node, base station, eNB or other such network device may be performed by processing circuitry 370 executing instructions stored on device readable medium 380 or memory within processing circuitry 370. In alternative embodiments, some or all of the functionality may be provided by processing circuitry 370 without executing instructions stored on a separate or discrete device readable medium, such as in a hard-wired manner. In any of those embodiments, whether executing instructions stored on a device readable storage medium or not, processing circuitry 370 can be configured to perform the described functionality. The benefits provided by such functionality are not limited to processing circuitry 370 alone or to other components of network node 360, but are enjoyed by network node 360 as a whole, and/or by end users and the wireless network generally.

Device readable medium 380 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry 370. Device readable medium 380 may store any suitable instructions, data or information, including a computer program, software, an application including one or more of logic, rules, code, tables, etc. and/or other instructions capable of being executed by processing circuitry 370 and, utilized by network node 360. Device readable medium 380 may be used to store any calculations made by processing circuitry 370 and/or any data received via interface 390. In some embodiments, processing circuitry 370 and device readable medium 380 may be considered to be integrated.

Interface 390 is used in the wired or wireless communication of signaling and/or data between network node 360, network 306, and/or WDs 310. As illustrated, interface 390 comprises port(s)/terminal(s) 394 to send and receive data, for example to and from network 306 over a wired connection. Interface 390 also includes radio front end circuitry 392 that may be coupled to, or in certain embodiments a part of, antenna 362. Radio front end circuitry 392 comprises filters 398 and amplifiers 396. Radio front end circuitry 392 may be connected to antenna 362 and processing circuitry 370. Radio front end circuitry may be configured to condition signals communicated between antenna 362 and processing circuitry 370. Radio front end circuitry 392 may receive digital data that is to be sent out to other network nodes or WDs via a wireless connection. Radio front end circuitry 392 may convert the digital data into a radio signal having the appropriate channel and bandwidth parameters using a combination of filters 398 and/or amplifiers 396. The radio signal may then be transmitted via antenna 362. Similarly, when receiving data, antenna 362 may collect radio signals which are then converted into digital data by radio front end circuitry 392. The digital data may be passed to processing circuitry 370. In other embodiments, the interface may comprise different components and/or different combinations of components.

In certain alternative embodiments, network node 360 may not include separate radio front end circuitry 392, instead, processing circuitry 370 may comprise radio front end circuitry and may be connected to antenna 362 without separate radio front end circuitry 392. Similarly, in some embodiments, all or some of RF transceiver circuitry 372 may be considered a part of interface 390. In still other embodiments, interface 390 may include one or more ports or terminals 394, radio front end circuitry 392, and RF transceiver circuitry 372, as part of a radio unit (not shown), and interface 390 may communicate with baseband processing circuitry 374, which is part of a digital unit (not shown).

Antenna 362 may include one or more antennas, or antenna arrays, configured to send and/or receive wireless signals. Antenna 362 may be coupled to radio front end circuitry 390 and may be any type of antenna capable of transmitting and receiving data and/or signals wirelessly. In some embodiments, antenna 362 may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, antenna 362 may be separate from network node 360 and may be connectable to network node 360 through an interface or port.

Antenna 362, interface 390, and/or processing circuitry 370 may be configured to perform any receiving operations and/or certain obtaining operations described herein as being performed by a network node. Any information, data and/or signals may be received from a wireless device, another network node and/or any other network equipment. Similarly, antenna 362, interface 390, and/or processing circuitry 370 may be configured to perform any transmitting operations described herein as being performed by a network node. Any information, data and/or signals may be transmitted to a wireless device, another network node and/or any other network equipment.

Power circuitry 387 may comprise, or be coupled to, power management circuitry and is configured to supply the components of network node 360 with power for performing the functionality described herein. Power circuitry 387 may receive power from power source 386. Power source 386 and/or power circuitry 387 may be configured to provide power to the various components of network node 360 in a form suitable for the respective components (e.g., at a voltage and current level needed for each respective component). Power source 386 may either be included in, or external to, power circuitry 387 and/or network node 360. For example, network node 360 may be connectable to an external power source (e.g., an electricity outlet) via an input circuitry or interface such as an electrical cable, whereby the external power source supplies power to power circuitry 387. As a further example, power source 386 may comprise a source of power in the form of a battery or battery pack which is connected to, or integrated in, power circuitry 387. The battery may provide backup power should the external power source fail. Other types of power sources, such as photovoltaic devices, may also be used.

Alternative embodiments of network node 360 may include additional components beyond those shown in FIG. 3 that may be responsible for providing certain aspects of the network node's functionality, including any of the functionality described herein and/or any functionality necessary to support the subject matter described herein. For example, network node 360 may include user interface equipment to allow input of information into network node 360 and to allow output of information from network node 360. This may allow a user to perform diagnostic, maintenance, repair, and other administrative functions for network node 360.

As used herein, wireless device (WD) refers to a device capable, configured, arranged and/or operable to communicate wirelessly with network nodes and/or other wireless devices. Unless otherwise noted, the term WD may be used interchangeably herein with user equipment (UE). Communicating wirelessly may involve transmitting and/or receiving wireless signals using electromagnetic waves, radio waves, infrared waves, and/or other types of signals suitable for conveying information through air. In some embodiments, a WD may be configured to transmit and/or receive information without direct human interaction. For instance, a WD may be designed to transmit information to a network on a predetermined schedule, when triggered by an internal or external event, or in response to requests from the network. Examples of a WD include, but are not limited to, a smart phone, a mobile phone, a cell phone, a voice over IP (VoIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE). a vehicle-mounted wireless terminal device, etc. A WD may support device-to-device (D2D) communication, for example by implementing a 3GPP standard for sidelink communication, vehicle-to-vehicle (V2V), vehicle-to-infrastructure (V2I), vehicle-to-everything (V2X) and may in this case be referred to as a D2D communication device. As yet another specific example, in an Internet of Things (IoT) scenario, a WD may represent a machine or other device that performs monitoring and/or measurements, and transmits the results of such monitoring and/or measurements to another WD and/or a network node. The WD may in this case be a machine-to-machine (M2M) device, which may in a 3GPP context be referred to as an MTC device. As one particular example, the WD may be a UE implementing the 3GPP narrow band internet of things (NB-IoT) standard. Particular examples of such machines or devices are sensors, metering devices such as power meters, industrial machinery, or home or personal appliances (e.g. refrigerators, televisions, etc.) personal wearables (e.g., watches, fitness trackers, etc.). In other scenarios, a WD may represent a vehicle or other equipment that is capable of monitoring and/or reporting on its operational status or other functions associated with its operation. A WD as described above may represent the endpoint of a wireless connection, in which case the device may be referred to as a wireless terminal. Furthermore, a WD as described above may be mobile, in which case it may also be referred to as a mobile device or a mobile terminal.

As illustrated, wireless device 310 includes antenna 311, interface 314, processing circuitry 320, device readable medium 330, user interface equipment 332, auxiliary equipment 334, power source 336 and power circuitry 337. WD 310 may include multiple sets of one or more of the illustrated components for different wireless technologies supported by WD 310, such as, for example, GSM, WCDMA, LTE, NR, WiFi, WiMAX, or Bluetooth wireless technologies, just to mention a few. These wireless technologies may be integrated into the same or different chips or set of chips as other components within WD 310.

Antenna 311 may include one or more antennas or antenna arrays, configured to send and/or receive wireless signals, and is connected to interface 314. In certain alternative embodiments, antenna 311 may be separate from WD 310 and be connectable to WD 310 through an interface or port. Antenna 311, interface 314, and/or processing circuitry 320 may be configured to perform any receiving or transmitting operations described herein as being performed by a WD. Any information, data and/or signals may be received from a network node and/or another WD. In some embodiments, radio front end circuitry and/or antenna 311 may be considered an interface.

As illustrated, interface 314 comprises radio front end circuitry 312 and antenna 311. Radio front end circuitry 312 comprise one or more filters 318 and amplifiers 316. Radio front end circuitry 314 is connected to antenna 311 and processing circuitry 320, and is configured to condition signals communicated between antenna 311 and processing circuitry 320. Radio front end circuitry 312 may be coupled to or a part of antenna 311. In some embodiments, WD 310 may not include separate radio front end circuitry 312; rather, processing circuitry 320 may comprise radio front end circuitry and may be connected to antenna 311. Similarly, in some embodiments, some or all of RF transceiver circuitry 322 may be considered a part of interface 314. Radio front end circuitry 312 may receive digital data that is to be sent out to other network nodes or WDs via a wireless connection. Radio front end circuitry 312 may convert the digital data into a radio signal having the appropriate channel and bandwidth parameters using a combination of filters 318 and/or amplifiers 316. The radio signal may then be transmitted via antenna 311. Similarly, when receiving data, antenna 311 may collect radio signals which are then converted into digital data by radio front end circuitry 312. The digital data may be passed to processing circuitry 320. In other embodiments, the interface may comprise different components and/or different combinations of components.

Processing circuitry 320 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other WD 310 components, such as device readable medium 330, WD 310 functionality. Such functionality may include providing any of the various wireless features or benefits discussed herein. For example, processing circuitry 320 may execute instructions stored in device readable medium 330 or in memory within processing circuitry 320 to provide the functionality disclosed herein.

As illustrated, processing circuitry 320 includes one or more of RF transceiver circuitry 322, baseband processing circuitry 324, and application processing circuitry 326. In other embodiments, the processing circuitry may comprise different components and/or different combinations of components. In certain embodiments processing circuitry 320 of WD 310 may comprise a SOC. In some embodiments, RF transceiver circuitry 322, baseband processing circuitry 324, and application processing circuitry 326 may be on separate chips or sets of chips. In alternative embodiments, part or all of baseband processing circuitry 324 and application processing circuitry 326 may be combined into one chip or set of chips, and RF transceiver circuitry 322 may be on a separate chip or set of chips. In still alternative embodiments, part or all of RF transceiver circuitry 322 and baseband processing circuitry 324 may be on the same chip or set of chips, and application processing circuitry 326 may be on a separate chip or set of chips. In yet other alternative embodiments, part or all of RF transceiver circuitry 322, baseband processing circuitry 324, and application processing circuitry 326 may be combined in the same chip or set of chips. In some embodiments, RF transceiver circuitry 322 may be a part of interface 314. RF transceiver circuitry 322 may condition RF signals for processing circuitry 320.

In certain embodiments, some or all of the functionality described herein as being performed by a WD may be provided by processing circuitry 320 executing instructions stored on device readable medium 330, which in certain embodiments may be a computer-readable storage medium. In alternative embodiments, some or all of the functionality may be provided by processing circuitry 320 without executing instructions stored on a separate or discrete device readable storage medium, such as in a hard-wired manner. In any of those particular embodiments, whether executing instructions stored on a device readable storage medium or not, processing circuitry 320 can be configured to perform the described functionality. The benefits provided by such functionality are not limited to processing circuitry 320 alone or to other components of WD 310, but are enjoyed by WD 310 as a whole, and/or by end users and the wireless network generally.

Processing circuitry 320 may be configured to perform any determining, calculating, or similar operations (e.g., certain obtaining operations) described herein as being performed by a WD. These operations, as performed by processing circuitry 320, may include processing information obtained by processing circuitry 320 by, for example, converting the obtained information into other information, comparing the obtained information or converted information to information stored by WD 310, and/or performing one or more operations based on the obtained information or converted information, and as a result of said processing making a determination.

Device readable medium 330 may be operable to store a computer program, software, an application including one or more of logic, rules, code, tables, etc. and/or other instructions capable of being executed by processing circuitry 320. Device readable medium 330 may include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that may be used by processing circuitry 320. In some embodiments, processing circuitry 320 and device readable medium 330 may be considered to be integrated.

User interface equipment 332 may provide components that allow for a human user to interact with WD 310. Such interaction may be of many forms, such as visual, audial, tactile, etc. User interface equipment 332 may be operable to produce output to the user and to allow the user to provide input to WD 310. The type of interaction may vary depending on the type of user interface equipment 332 installed in WD 310. For example, if WD 310 is a smart phone, the interaction may be via a touch screen; if WD 310 is a smart meter, the interaction may be through a screen that provides usage (e.g., the number of gallons used) or a speaker that provides an audible alert (e.g., if smoke is detected). User interface equipment 332 may include input interfaces, devices and circuits, and output interfaces, devices and circuits. User interface equipment 332 is configured to allow input of information into WD 310, and is connected to processing circuitry 320 to allow processing circuitry 320 to process the input information. User interface equipment 332 may include, for example, a microphone, a proximity or other sensor, keys/buttons, a touch display, one or more cameras, a USB port, or other input circuitry. User interface equipment 332 is also configured to allow output of information from WD 310, and to allow processing circuitry 320 to output information from WD 310. User interface equipment 332 may include, for example, a speaker, a display, vibrating circuitry, a USB port, a headphone interface, or other output circuitry. Using one or more input and output interfaces, devices, and circuits, of user interface equipment 332, WD 310 may communicate with end users and/or the wireless network, and allow them to benefit from the functionality described herein.

Auxiliary equipment 334 is operable to provide more specific functionality which may not be generally performed by WDs. This may comprise specialized sensors for doing measurements for various purposes, interfaces for additional types of communication such as wired communications etc. The inclusion and type of components of auxiliary equipment 334 may vary depending on the embodiment and/or scenario.

Power source 336 may, in some embodiments, be in the form of a battery or battery pack. Other types of power sources, such as an external power source (e.g., an electricity outlet), photovoltaic devices or power cells, may also be used. WD 310 may further comprise power circuitry 337 for delivering power from power source 336 to the various parts of WD 310 which need power from power source 336 to carry out any functionality described or indicated herein. Power circuitry 337 may in certain embodiments comprise power management circuitry. Power circuitry 337 may additionally or alternatively be operable to receive power from an external power source; in which case WD 310 may be connectable to the external power source (such as an electricity outlet) via input circuitry or an interface such as an electrical power cable. Power circuitry 337 may also in certain embodiments be operable to deliver power from an external power source to power source 336. This may be, for example, for the charging of power source 336. Power circuitry 337 may perform any formatting, converting, or other modification to the power from power source 336 to make the power suitable for the respective components of WD 310 to which power is supplied.

Figure 4:
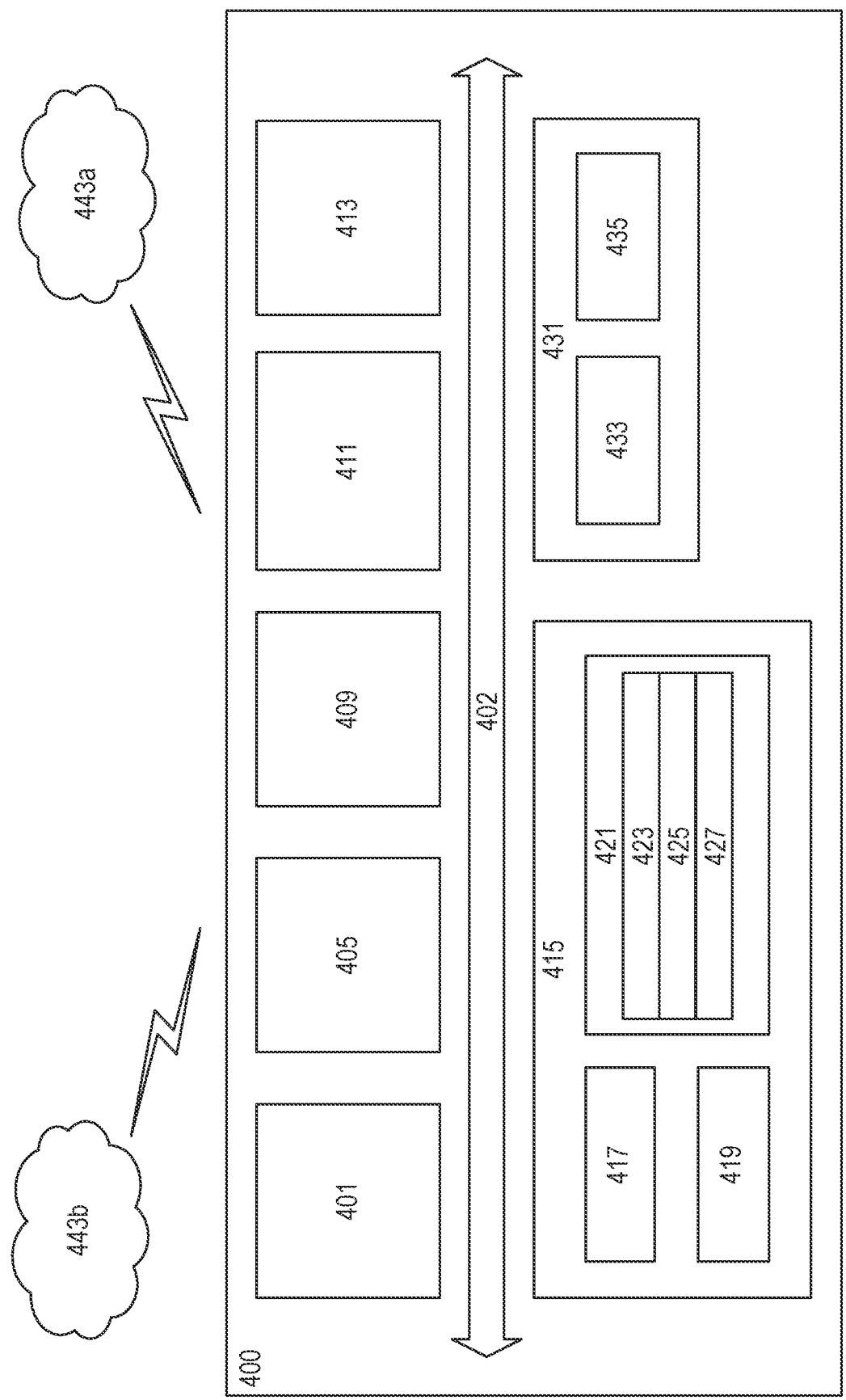
FIG. 4 illustrates in more detail a form of a wireless device.

FIG. 4 illustrates one embodiment of a UE in accordance with various aspects described herein. As used herein, a user equipment or UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter). UE 400 may be any UE identified by the 3rd Generation Partnership Project (3GPP), including a NB-IoT UE, a machine type communication (MTC) UE, and/or an enhanced MTC (eMTC) UE. UE 400, as illustrated in FIG. 4, is one example of a WD configured for communication in accordance with one or more communication standards promulgated by the 3rd Generation Partnership Project (3GPP), such as 3GPP's GSM, UMTS, LTE, and/or 5G standards. As mentioned previously, the term WD and UE may be used interchangeably. Accordingly, although FIG. 4 is a UE, the components discussed herein are equally applicable to a WD, and vice-versa.

In FIG. 4, UE 400 includes processing circuitry 401 that is operatively coupled to input/output interface 405, radio frequency (RF) interface 409, network connection interface 411, memory 415 including random access memory (RAM) 417, read-only memory (ROM) 419, and storage medium 421 or the like, communication subsystem 431, power source 433, and/or any other component, or any combination thereof. Storage medium 421 includes operating system 423, application program 425, and data 427. In other embodiments, storage medium 421 may include other similar types of information. Certain UEs may utilize all of the components shown in FIG. 4, or only a subset of the components. The level of integration between the components may vary from one UE to another UE. Further, certain UEs may contain multiple instances of a component, such as multiple processors, memories, transceivers, transmitters, receivers, etc.

In FIG. 4, processing circuitry 401 may be configured to process computer instructions and data. Processing circuitry 401 may be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry 401 may include two central processing units (CPUs). Data may be information in a form suitable for use by a computer.

In the depicted embodiment, input/output interface 405 may be configured to provide a communication interface to an input device, output device, or input and output device. UE 400 may be configured to use an output device via input/output interface 405. An output device may use the same type of interface port as an input device. For example, a USB port may be used to provide input to and output from UE 400. The output device may be a speaker, a sound card, a video card, a display, a monitor, a printer, an actuator, an emitter, a smartcard, another output device, or any combination thereof. UE 400 may be configured to use an input device via input/output interface 405 to allow a user to capture information into UE 400. The input device may include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, another like sensor, or any combination thereof. For example, the input device may be an accelerometer, a magnetometer, a digital camera, a microphone, and an optical sensor.

In FIG. 4, RF interface 409 may be configured to provide a communication interface to RF components such as a transmitter, a receiver, and an antenna. Network connection interface 411 may be configured to provide a communication interface to network 443a. Network 443a may encompass wired and/or wireless networks such as a local-area network (LAN), a wide-area network (WAN), a computer network, a wireless network, a telecommunications network, another like network or any combination thereof. For example, network 443a may comprise a Wi-Fi network. Network connection interface 411 may be configured to include a receiver and a transmitter interface used to communicate with one or more other devices over a communication network according to one or more communication protocols, such as Ethernet, TCP/IP, SONET, ATM, or the like. Network connection interface 411 may implement receiver and transmitter functionality appropriate to the communication network links (e.g., optical, electrical, and the like). The transmitter and receiver functions may share circuit components, software or firmware, or alternatively may be implemented separately.

RAM 417 may be configured to interface via bus 402 to processing circuitry 401 to provide storage or caching of data or computer instructions during the execution of software programs such as the operating system, application programs, and device drivers. ROM 419 may be configured to provide computer instructions or data to processing circuitry 401. For example, ROM 419 may be configured to store invariant low-level system code or data for basic system functions such as basic input and output (I/O), startup, or reception of keystrokes from a keyboard that are stored in a non-volatile memory. Storage medium 421 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, storage medium 421 may be configured to include operating system 423, application program 425 such as a web browser application, a widget or gadget engine or another application, and data file 427. Storage medium 421 may store, for use by UE 400, any of a variety of various operating systems or combinations of operating systems.

Storage medium 421 may be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium 421 may allow UE 400 to access computer-executable instructions, application programs or the like, stored on transitory or non-transitory memory media, to off-load data, or to upload data. An article of manufacture, such as one utilizing a communication system may be tangibly embodied in storage medium 421, which may comprise a device readable medium.

In FIG. 4, processing circuitry 401 may be configured to communicate with network 443b using communication subsystem 431. Network 443a and network 443b may be the same network or networks or different network or networks. Communication subsystem 431 may be configured to include one or more transceivers used to communicate with network 443b. For example, communication subsystem 431 may be configured to include one or more transceivers used to communicate with one or more remote transceivers of another device capable of wireless communication such as another WD, UE, or base station of a radio access network (RAN) according to one or more communication protocols, such as IEEE 802.11, CDMA, WCDMA, GSM, LTE, UTRAN, WiMAX, or the like. Each transceiver may include transmitter 433 and/or receiver 435 to implement transmitter or receiver functionality, respectively, appropriate to the RAN links (e.g., frequency allocations and the like). Further, transmitter 433 and receiver 435 of each transceiver may share circuit components, software or firmware, or alternatively may be implemented separately.

In the illustrated embodiment, the communication functions of communication subsystem 431 may include data communication, voice communication, multimedia communication, short-range communications such as Bluetooth, near-field communication, location-based communication such as the use of the global positioning system (GPS) to determine a location, another like communication function, or any combination thereof. For example, communication subsystem 431 may include cellular communication, Wi-Fi communication, Bluetooth communication, and GPS communication. Network 443b may encompass wired and/or wireless networks such as a local-area network (LAN), a wide-area network (WAN), a computer network, a wireless network, a telecommunications network, another like network or any combination thereof. For example, network 443b may be a cellular network, a Wi-Fi network, and/or a near-field network. Power source 413 may be configured to provide alternating current (AC) or direct current (DC) power to components of UE 400.

The features, benefits and/or functions described herein may be implemented in one of the components of UE 400 or partitioned across multiple components of UE 400. Further, the features, benefits, and/or functions described herein may be implemented in any combination of hardware, software or firmware. In one example, communication subsystem 431 may be configured to include any of the components described herein. Further, processing circuitry 401 may be configured to communicate with any of such components over bus 402. In another example, any of such components may be represented by program instructions stored in memory that when executed by processing circuitry 401 perform the corresponding functions described herein. In another example, the functionality of any of such components may be partitioned between processing circuitry 401 and communication subsystem 431. In another example, the non-computationally intensive functions of any of such components may be implemented in software or firmware and the computationally intensive functions may be implemented in hardware.

Figure 5:
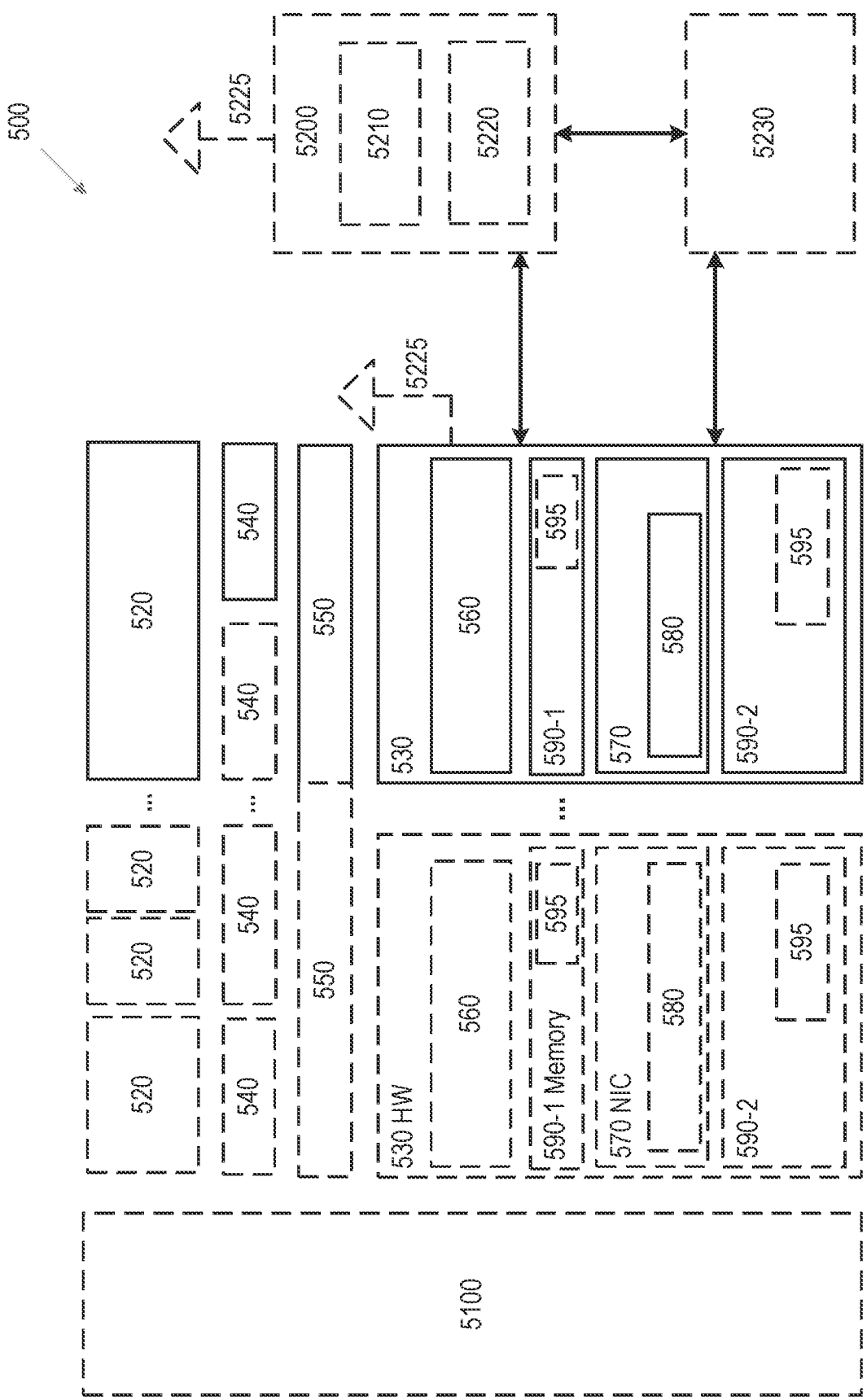
FIG. 5 illustrates in more detail a form of a network node.

FIG. 5 is a schematic block diagram illustrating a virtualization environment 500 in which functions implemented by some embodiments may be virtualized. In the present context, virtualizing means creating virtual versions of apparatuses or devices which may include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein may be implemented as virtual components executed by one or more virtual machines implemented in one or more virtual environments 500 hosted by one or more of hardware nodes 530. Further, in embodiments in which the virtual node is not a radio access node or does not require radio connectivity (e.g., a core network node), then the network node may be entirely virtualized.

The functions may be implemented by one or more applications 520 (which may alternatively be called software instances, virtual appliances, network functions, virtual nodes, virtual network functions, etc.) operative to implement some of the features, functions, and/or benefits of some of the embodiments disclosed herein. Applications 520 are run in virtualization environment 500 which provides hardware 530 comprising processing circuitry 560 and memory 590. Memory 590 contains instructions 595 executable by processing circuitry 560 whereby application 520 is operative to provide one or more of the features, benefits, and/or functions disclosed herein.

Virtualization environment 500, comprises general-purpose or special-purpose network hardware devices 530 comprising a set of one or more processors or processing circuitry 560, which may be commercial off-the-shelf (COTS) processors, dedicated Application Specific Integrated Circuits (ASICs), or any other type of processing circuitry including digital or analog hardware components or special purpose processors. Each hardware device may comprise memory 590-1 which may be non-persistent memory for temporarily storing instructions 595 or software executed by processing circuitry 560. Each hardware device may comprise one or more network interface controllers (NICs) 570, also known as network interface cards, which include physical network interface 580. Each hardware device may also include non-transitory, persistent, machine-readable storage media 590-2 having stored therein software 595 and/or instructions executable by processing circuitry 560. Software 595 may include any type of software including software for instantiating one or more virtualization layers 550 (also referred to as hypervisors), software to execute virtual machines 540 as well as software allowing it to execute functions, features and/or benefits described in relation with some embodiments described herein.

Virtual machines 540, comprise virtual processing, virtual memory, virtual networking or interface and virtual storage, and may be run by a corresponding virtualization layer 550 or hypervisor. Different embodiments of the instance of virtual appliance 520 may be implemented on one or more of virtual machines 540, and the implementations may be made in different ways.

During operation, processing circuitry 560 executes software 595 to instantiate the hypervisor or virtualization layer 550, which may sometimes be referred to as a virtual machine monitor (VMM). Virtualization layer 550 may present a virtual operating platform that appears like networking hardware to virtual machine 540.

As shown in FIG. 5, hardware 530 may be a standalone network node with generic or specific components. Hardware 530 may comprise antenna 5225 and may implement some functions via virtualization. Alternatively, hardware 530 may be part of a larger cluster of hardware (e.g. such as in a data center or customer premise equipment (CPE)) where many hardware nodes work together and are managed via management and orchestration (MANO) 5100, which, among others, oversees lifecycle management of applications 520.

Virtualization of the hardware is in some contexts referred to as network function virtualization (NFV). NFV may be used to consolidate many network equipment types onto industry standard high volume server hardware, physical switches, and physical storage, which can be located in data centers, and customer premise equipment.

In the context of NFV, virtual machine 540 may be a software implementation of a physical machine that runs programs as if they were executing on a physical, non-virtualized machine. Each of virtual machines 540, and that part of hardware 530 that executes that virtual machine, be it hardware dedicated to that virtual machine and/or hardware shared by that virtual machine with others of the virtual machines 540, forms a separate virtual network elements (VNE).

Still in the context of NFV, Virtual Network Function (VNF) is responsible for handling specific network functions that run in one or more virtual machines 540 on top of hardware networking infrastructure 530 and corresponds to application 520 in FIG. 5.

In some embodiments, one or more radio units 5200 that each include one or more transmitters 5220 and one or more receivers 5210 may be coupled to one or more antennas 5225. Radio units 5200 may communicate directly with hardware nodes 530 via one or more appropriate network interfaces and may be used in combination with the virtual components to provide a virtual node with radio capabilities, such as a radio access node or a base station.

In some embodiments, some signaling can be effected with the use of control system 5230 which may alternatively be used for communication between the hardware nodes 530 and radio units 5200.

Figure 6:
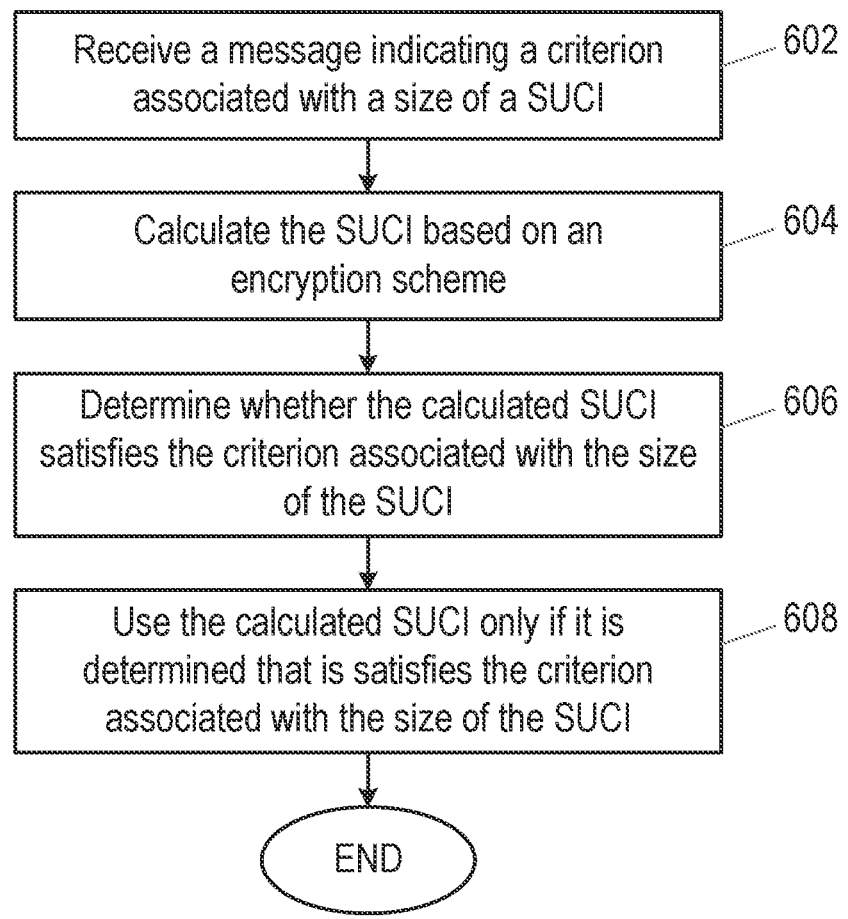
FIG. 6 is a flow chart, illustrating a first method.

FIG. 6 is a flow chart, which depicts a method in accordance with particular embodiments, and specifically a method performed by a wireless device for calculating a subscription concealed identifier, SUCI. The method begins at step 602 when the wireless device receives a message indicating a criterion associated with a size of a SUCI. At step 604, the wireless device calculates the SUCI based on an encryption scheme. At step 606, the wireless device determines whether the calculated SUCI satisfies the criterion associated with the size of the SUCI. At step 608, the wireless device uses the calculated SUCI only if it is determined that it satisfies the criterion associated with the size of the SUCI. More specifically, if the wireless device determines that the calculated SUCI does not satisfy the criterion associated with the size of the SUCI (that is, for example, if the size of the SUCI exceeds a maximum size), in certain embodiments the wireless device does not send the calculated SUCI to the network. The maximum size may be set based on the scheme used for calculating the SUCI.

Figure 7:
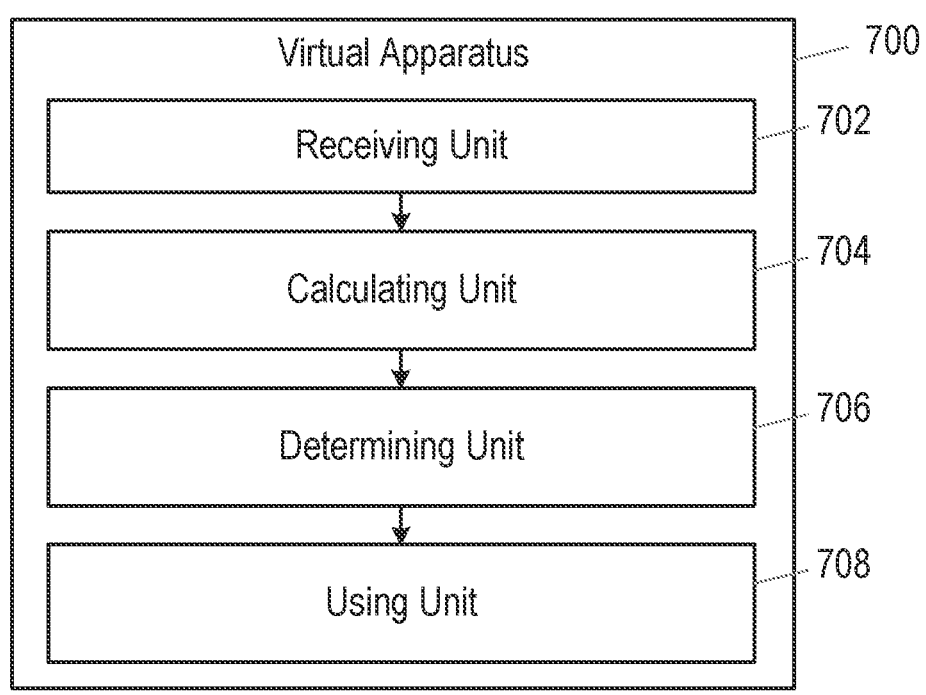
FIG. 7 illustrates a form of a wireless device for performing the first method.
Figure 8:
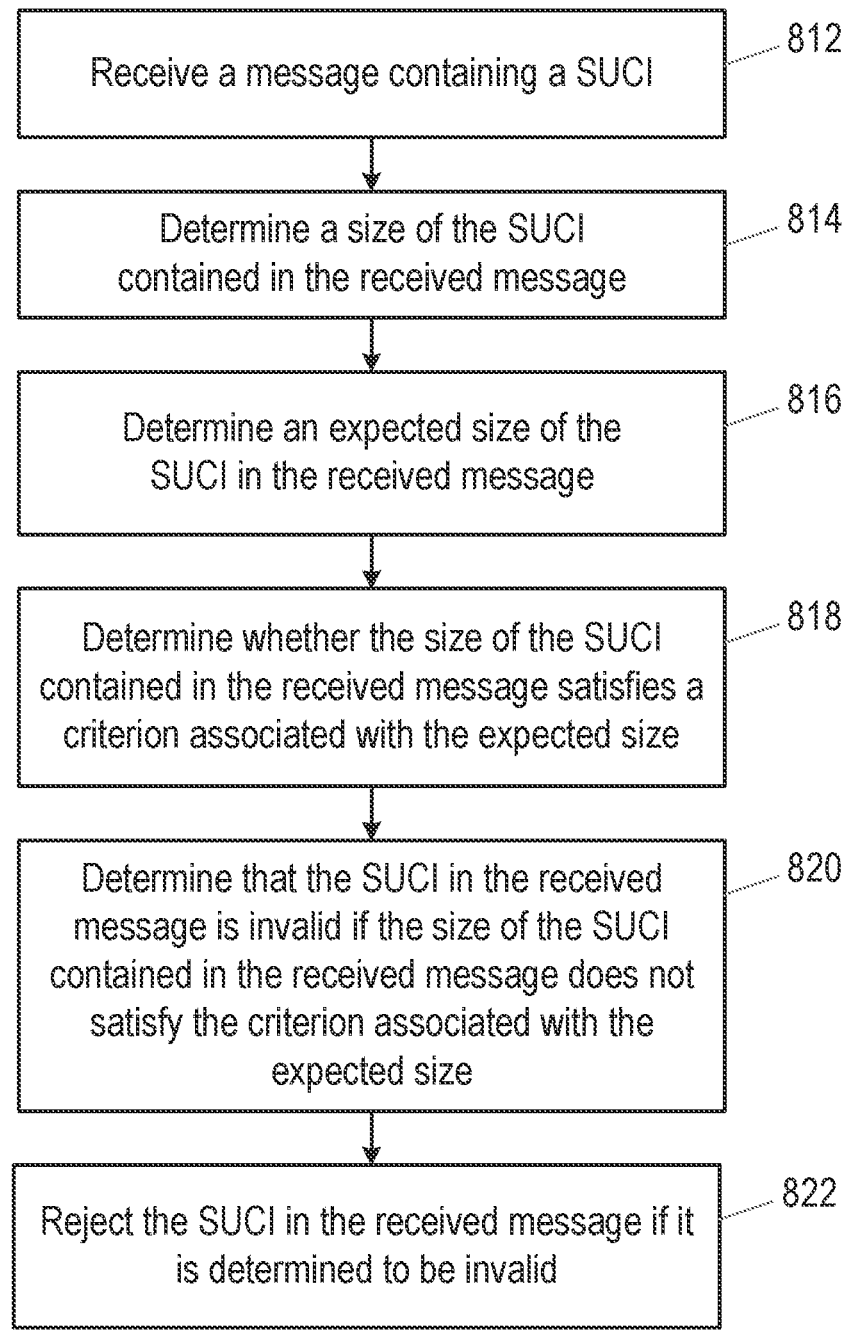
FIG. 8 is a flow chart, illustrating a second method.

FIG. 7 is a schematic block diagram of a virtual apparatus 700 in a wireless network (for example, the wireless network shown in FIG. 3). The apparatus may be implemented in a wireless device or network node (e.g., wireless device 310 or network node 360 shown in FIG. 3). Apparatus 700 is operable to carry out the example method described with reference to FIG. 8 and possibly any other processes or methods disclosed herein. It is also to be understood that the method of FIG. 8 is not necessarily carried out solely by apparatus 700. At least some operations of the method can be performed by one or more other entities.

Virtual Apparatus 700 may comprise processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory includes program instructions for executing one or more telecommunications and/or data communications protocols as well as instructions for carrying out one or more of the techniques described herein, in several embodiments. In some implementations, the processing circuitry may be used to cause receiving unit 702, calculating unit 704, determining unit 706, and using unit 708 and any other suitable units of apparatus 700 to perform corresponding functions according to one or more embodiments of the present disclosure.

As illustrated in FIG. 7, apparatus 700 includes receiving unit 702, for receiving a message indicating a criterion associated with a size of a SUCI; calculating unit 704, for calculating the SUCI based on an encryption scheme; determining unit 706, for determining whether the calculated SUCI satisfies the criterion associated with the size of the SUCI; and using unit 708, for using the calculated SUCI only if it is determined that it satisfies the criterion associated with the size of the SUCI.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

FIG. 8 is a flow chart, which depicts a method in accordance with particular embodiments, and specifically a method performed by a network function to identify an invalid subscription concealed identifier, SUCI. The method comprises:

step 812, receiving a message containing a SUCI;

step 814, determining a size of the SUCI contained in the received message;

step 816, determining an expected size of the SUCI in the received message;

step 818, determining whether the size of the SUCI contained in the received message satisfies a criterion associated with the expected size;

step 820, determining that the SUCI in the received message is invalid if the size of the SUCI contained in the received message does not satisfy the criterion associated with the expected size; and step 822, rejecting the SUCI in the received message if it is determined to be invalid.

Figure 9:
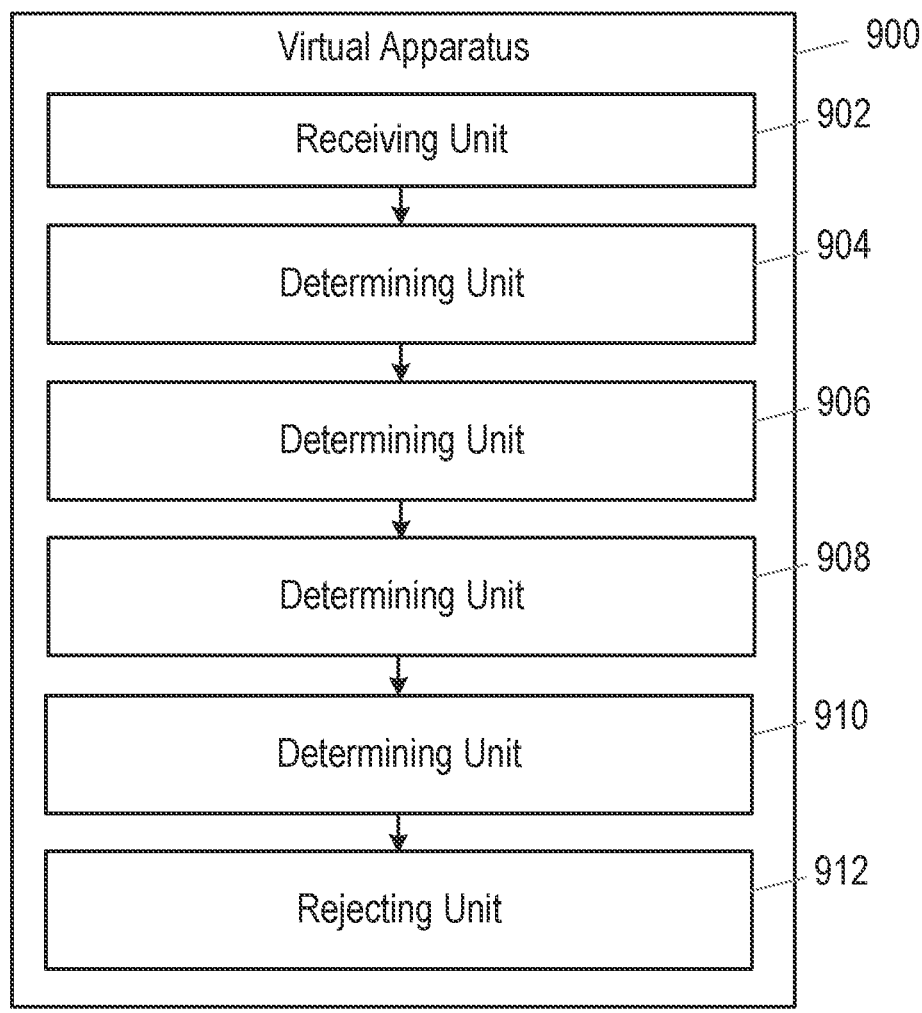
FIG. 9 illustrates a form of a network node for performing the second method.

FIG. 9 illustrates a schematic block diagram of a virtual apparatus 900 in a wireless network (for example, the wireless network shown in FIG. 3). The apparatus may be implemented in a wireless device or network node (e.g., wireless device 310 or network node 360 shown in FIG. 3). Apparatus 900 is operable to carry out the example method described with reference to FIG. 8 and possibly any other processes or methods disclosed herein. It is also to be understood that the method of FIG. 8 is not necessarily carried out solely by apparatus 900. At least some operations of the method can be performed by one or more other entities.

Virtual Apparatus 900 may comprise processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory includes program instructions for executing one or more telecommunications and/or data communications protocols as well as instructions for carrying out one or more of the techniques described herein, in several embodiments. In some implementations, the processing circuitry may be used to cause receiving unit 902, determining unit 904, determining unit 906, determining unit 908, determining unit 910, and rejecting unit 912, and any other suitable units of apparatus 900 to perform corresponding functions according one or more embodiments of the present disclosure.

As illustrated in FIG. 9, apparatus 900 includes receiving unit 902, for receiving a message containing a SUCI; determining unit 904, for determining a size of the SUCI contained in the received message; determining unit 906, for determining an expected size of the SUCI in the received message; determining unit 908, for determining whether the size of the SUCI contained in the received message satisfies a criterion associated with the expected size; determining unit 910, for determining that the SUCI in the received message is invalid if the size of the SUCI contained in the received message does not satisfy the criterion associated with the expected size; and rejecting unit 912, for rejecting the SUCI in the received message if it is determined to be invalid.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

At least some of the following abbreviations may be used in this disclosure. If there is an inconsistency between abbreviations, preference should be given to how it is used above. If listed multiple times below, the first listing should be preferred over any subsequent listing(s).

1×RTT CDMA2000 1× Radio Transmission Technology
3GPP 3rd Generation Partnership Project
5G 5th Generation
ABS Almost Blank Subframe
ARQ Automatic Repeat Request
AWGN Additive White Gaussian Noise
BCCH Broadcast Control Channel
BCH Broadcast Channel
CA Carrier Aggregation
CC Carrier Component
CCCH SDU Common Control Channel SDU
CDMA Code Division Multiplexing Access
CGI Cell Global Identifier
CIR Channel Impulse Response
CP Cyclic Prefix
CPICH Common Pilot Channel
CPICH Ec/No CPICH Received energy per chip divided by the power density in the band
CQI Channel Quality information
C-RNTI Cell RNTI
CSI Channel State Information
DCCH Dedicated Control Channel
DL Downlink
DM Demodulation
DMRS Demodulation Reference Signal
DRX Discontinuous Reception
DTX Discontinuous Transmission
DTCH Dedicated Traffic Channel
DUT Device Under Test
E-CID Enhanced Cell-ID (positioning method)
E-SM LC Evolved-Serving Mobile Location Centre
ECGI Evolved CGI
eNB E-UTRAN NodeB
ePDCCH enhanced Physical Downlink Control Channel
E-SM LC evolved Serving Mobile Location Center
E-UTRA Evolved UTRA
E-UTRAN Evolved UTRAN
FDD Frequency Division Duplex
FFS For Further Study
GERAN GSM EDGE Radio Access Network
gNB Base station in NR
GNSS Global Navigation Satellite System
GSM Global System for Mobile communication
HARQ Hybrid Automatic Repeat Request
HO Handover
HSPA High Speed Packet Access
HRPD High Rate Packet Data
LOS Line of Sight
LPP LTE Positioning Protocol
LTE Long-Term Evolution
MAC Medium Access Control
MBMS Multimedia Broadcast Multicast Services
MBSFN Multimedia Broadcast multicast service Single Frequency Network
MBSFN ABS MBSFN Almost Blank Subframe
MDT Minimization of Drive Tests
MIB Master Information Block
MME Mobility Management Entity
MSC Mobile Switching Center
NPDCCH Narrowband Physical Downlink Control Channel
NR New Radio
OCNG OFDMA Channel Noise Generator
OFDM Orthogonal Frequency Division Multiplexing
OFDMA Orthogonal Frequency Division Multiple Access
OSS Operations Support System
OTDOA Observed Time Difference of Arrival
O&M Operation and Maintenance
PBCH Physical Broadcast Channel
P-CCPCH Primary Common Control Physical Channel
PCell Primary Cell
PCFICH Physical Control Format Indicator Channel
PDCCH Physical Downlink Control Channel PDP Profile Delay Profile
PDSCH Physical Downlink Shared Channel
PGW Packet Gateway
PHICH Physical Hybrid-ARQ Indicator Channel
PLMN Public Land Mobile Network
PMI Precoder Matrix Indicator
PRACH Physical Random Access Channel
PRS Positioning Reference Signal
PSS Primary Synchronization Signal
PUCCH Physical Uplink Control Channel
PUSCH Physical Uplink Shared Channel
RACH Random Access Channel
QAM Quadrature Amplitude Modulation
RAN Radio Access Network
RAT Radio Access Technology
RLM Radio Link Management
RNC Radio Network Controller
RNTI Radio Network Temporary Identifier
RRC Radio Resource Control
RRM Radio Resource Management
RS Reference Signal
RSCP Received Signal Code Power
RSRP Reference Symbol Received Power OR Reference Signal Received Power
RSRQ Reference Signal Received Quality OR Reference Symbol Received Quality
RSSI Received Signal Strength Indicator
RSTD Reference Signal Time Difference
SCH Synchronization Channel
SCell Secondary Cell
SDU Service Data Unit
SFN System Frame Number
SGW Serving Gateway
SI System Information
SIB System Information Block
SNR Signal to Noise Ratio
SON Self Optimized Network
SS Synchronization Signal
SSS Secondary Synchronization Signal
TDD Time Division Duplex
TDOA Time Difference of Arrival
TOA Time of Arrival
TSS Tertiary Synchronization Signal
TTI Transmission Time Interval
UE User Equipment
UL Uplink
UMTS Universal Mobile Telecommunication System
USIM Universal Subscriber Identity Module
UTDOA Uplink Time Difference of Arrival
UTRA Universal Terrestrial Radio Access
UTRAN Universal Terrestrial Radio Access Network
WCDMA Wide CDMA
WLAN Wide Local Area Network

What is claimed is:

1. A method, performed by a network function, to identify an invalid subscription concealed identifier (SUCI), the method comprising the network function:
receiving a message containing a SUCI;
determining that the SUCI in the received message is invalid when a size of the SUCI contained in the received message does not satisfy a criterion associated with an expected size; and
rejecting the SUCI in the received message when the SUCI in the received message is determined to be invalid.

2. The method of claim 1, wherein the expected size of the SUCI in the received message is based on an encryption scheme used for calculating the SUCI.

3. The method of claim 2, wherein the encryption scheme used for calculating the SUCI is a standardized encryption scheme.

4. The method of claim 2, wherein the encryption scheme used for calculating the SUCI is a proprietary encryption scheme.

5. The method of claim 1, wherein the expected size of the SUCI in the received message applies to all SUCIs in the network.

6. The method of claim 1, wherein the expected size of the SUCI in the received message applies to all SUCIs in a local area of the network.

7. The method of claim 1, further comprising determining the expected size of the SUCI in the received message based on at least one other factor.

8. The method of claim 7, wherein the at least one other factor comprises: time, location, network load, network type, operator information, and/or roaming partner information.

9. The method of claim 1, wherein the criterion associated with the expected size comprises a maximum size that is greater than the expected size.

10. The method of claim 1, wherein the criterion associated with the expected size comprises a minimum size that is smaller than the expected size.

11. The method of claim 1, wherein the criterion associated with the expected size comprises a size range that encompasses the expected size.

12. A network node configured to identify an invalid subscription concealed identifier (SUCI), the network node comprising:
processing circuitry;
memory containing instructions executable by the processing circuitry whereby the network node is operative to:
receive a message containing a SUCI;
determine that the SUCI in the received message is invalid when a size of the SUCI contained in the received message does not satisfy a criterion associated with an expected size; and
reject the SUCI in the received message when the SUCI in the received message is determined to be invalid.

13. The network node of claim 12, wherein the expected size of the SUCI in the received message is based on an encryption scheme used for calculating the SUCI.

14. The network node of claim 13, wherein the encryption scheme used for calculating the SUCI is a standardized encryption scheme.

15. The network node of claim 12, wherein the expected size of the SUCI in the received message applies to all SUCIs in the network.

16. The network node of claim 12, wherein the instructions are such that the network node is operative to determine the expected size of the SUCI in the received message based on at least one other factor.

17. The network node of claim 16, wherein the at least one other factor comprises: time, location, network load, network type, operator information, and/or roaming partner information.

18. The network node of claim 12, wherein the criterion associated with the expected size comprises a maximum size that is greater than the expected size.

19. The network node of claim 12, wherein the criterion associated with the expected size comprises a minimum size that is smaller than the expected size.

20. The network node of claim 12, wherein the criterion associated with the expected size comprises a size range that encompasses the expected size.

\* \* \* \* \*

UNITED STATES PATENT AND TRADEMARK OFFICE
CERTIFICATE OF CORRECTION

Page 1 of 3

PATENT NO. : 11,589,211 B2
APPLICATION NO. : 17/375137
DATED : February 21, 2023
INVENTOR(S) : Nakarmi et al.

It is certified that error appears in the above-identified patent and that said Letters Patent is hereby corrected as shown below:

On the Title Page

On Page 2, item (56), under "OTHER PUBLICATIONS", in Column 2, Line 5, delete "Gothenberg," and insert -- Gothenburg, --, therefor.

On Page 2, item (56), under "OTHER PUBLICATIONS", in Column 2, Line 9, delete "Artchitecture" and insert -- Architecture --, therefor.

In the Drawings

In Fig. 1, Sheet 1 of 9, for Tag "102", in Line 1, delete "RegistrationRequest" and insert -- Registration Request --, therefor.

In Fig. 2, Sheet 2 of 9, and on the Title Page, the illustrative figure, for Tag "214", in Line 2, delete "function" and insert -- function? --, therefor.

In Fig. 2, Sheet 2 of 9, and on the Title Page, the illustrative figure, for Tag "216", in Line 2, delete "function" and insert -- function? --, therefor.

In Fig. 6, Sheet 6 of 9, for Tag "608", in Line 2, delete "that is" and insert -- that it --, therefor.

In the Specification

In Column 1, Line 6, delete "2019," and insert -- 2019, now U.S. Pat. No. 11,102,640 --, therefor.

In Column 1, Lines 62-63, delete "send concealed a identifier" and insert -- send a concealed identifier --, therefor.

In Column 2, Line 2, delete "(denoted HN" and insert -- (denoted as HN --, therefor.

Signed and Sealed this
Fourth Day of July, 2023

Katherine Kelly Vidal
*Director of the United States Patent and Trademark Office*

CERTIFICATE OF CORRECTION (continued)
U.S. Pat. No. 11,589,211 B2

In Column 2, Lines 4-5, delete "ways denoted" and insert -- ways are denoted --, therefor.

In Column 2, Line 6, delete "EIGamal" and insert -- ElGamal --, therefor.

In Column 2, Line 14, delete "encryptions schemes." and insert -- encryption schemes. --, therefor.

In Column 2, Line 15, delete "EIGamal" and insert -- ElGamal --, therefor.

In Column 2, Line 50, delete "Note that the in case of" and insert -- Note that in the case of --, therefor.

In Column 3, Line 37, delete "suitably" and insert -- suitable --, therefor.

In Column 4, Lines 44-45, delete "RAS encryption" and insert -- RSA encryption --, therefor.

In Column 4, Line 48, delete "that it used" and insert -- that is used --, therefor.

In Column 5, Line 22, delete "method" and insert -- method of --, therefor.

In Column 5, Line 25, delete "(denoted encryption" and insert -- (denoted as encryption --, therefor.

In Column 5, Line 32, delete "any" and insert -- any of --, therefor.

In Column 5, Line 45, delete "larger the" and insert -- larger than the --, therefor.

In Column 8, Line 38, delete "WIFI." and insert -- WiFi. --, therefor.

In Column 10, Line 41, delete "NodeB's" and insert -- NodeBs. --, therefor.

In Column 11, Line 25, delete "units" and insert -- units. --, therefor.

In Column 13, Line 53, delete "(CPE)." and insert -- (CPE), --, therefor.

In Column 17, Line 24, delete "interchangeable." and insert -- interchangeably. --, therefor.

In Column 19, Line 4, delete "(SIM/RUIM) module," and insert -- module (SIM/RUIM), --, therefor.

In Column 23, Line 33, delete "according" and insert -- according to --, therefor.

In Column 24, Line 6, delete "CDMA Code Division Multiplexing Access" and insert -- CDMA Code Division Multiple Access --, therefor.

In Column 24, Line 25, delete "E-SM LC" and insert -- E-SMLC --, therefor.

In Column 24, Line 29, delete "E-SM LC evolved Serving Mobile Location Center".

CERTIFICATE OF CORRECTION (continued)
U.S. Pat. No. 11,589,211 B2

In Column 25, Line 1, delete "PDP Profile Delay Profile" and insert -- PDP Power Delay Profile --, therefor.

In Column 25, Line 53, delete "WCDMA Wide CDMA" and insert -- WCDMA Wideband CDMA --, therefor.

In Column 25, Line 54, delete "WLAN Wide Local Area Network" and insert -- WLAN Wireless Local Area Network --, therefor.